United States Patent Office 3,483,212
Patented Dec. 9, 1969

1

3,483,212
5-NITROIMIDAZOLES
Max W. Miller, Stonington, Conn., assignor to Chas. Pfizer & Co., Inc., New York, N.Y., a corporation of Delaware
No Drawing. Filed Sept. 18, 1967, Ser. No. 668,655
Int. Cl. C07d 49/34
U.S. Cl. 260—309
10 Claims

ABSTRACT OF THE DISCLOSURE

A novel class of 5-nitroimidazole derivatives bearing electron withdrawing 1-side chains effective in the treatment and prevention of trichomonal infections is disclosed and a suitable means of preparing such compounds is described.

Background of the invention

This invention relates to novel and useful imidazole derivatives and, more particularly, to certain 5-nitroimidazole compounds possessing electron withdrawing groups in the 1-position which are effective anti-trichomonal agents. Examples of trichomonal infections include trichomonal vaginitis, a troublesome vaginal infection caused by the parasitic protozan *Trichomonas vaginalis* and bovine trichomoniasis caused by *Trichomonas foetus*. Up to now, various medicaments and methods of treatment have been used with varying degrees of effectiveness. Moreover, in the treatment of vaginitis a number of different drug classes are involved, for example, sulfonamides, fungicides, penicillin, vaginal cleansers, etc. In addition, product forms such as ointments, jellies, creams, powders, oral tablets and others have been used.

Summary of the invention

Accordingly, the present invention discloses compounds having the formula:

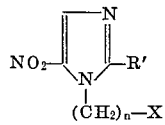

wherein $n$ is an integer from 1 to 3; R' is alkyl having from 1 to 4 carbon atoms; Y is selected from the group consisting of —SF$_5$, —SO$_2$CF$_3$, —SO$_2$NH$_2$, —SO$_2$NHR, —SO$_2$NR$_2$, —NHCF$_3$, —N(CF$_3$)$_2$, —CH(SO$_2$R)$_2$,

—CH(COOR)$_2$

—CH(CN)$_2$, —C(CN)$_3$, —CH(NO$_2$)$_2$, —C(NO$_2$)$_3$ and —NO$_2$ wherein said R groups contain from 1 to 4 carbon atoms and the pharmaceutically-acceptable acid addition salts thereof.
A particularly preferred embodiment of the herein described invention concerns those compounds represented by the above formula when R' is methyl and $n$ is 2.

2

Detailed description of the invention

The novel derivatives disclosed herein are prepared by the synthetic scheme outlined herein below:

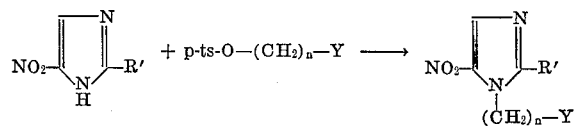

wherein R', $n$ and Y are as defined earlier. The symbol p-ts— signifies the p-toluenesulfonyl radical having the chemical structure:

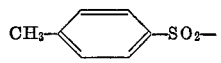

The above reaction is generally carried out without a solvent although it is possible to utilize a solvent provided its boiling point is sufficiently high at allow temperatures at reflux which are adequate for complete reaction. This particular temperature range is from about 100–150° C. In most instances, however, no solvent will be used and the mixture of p-toluenesulfonate and 5-nitroimidazole is simply heated to a temperature of from 130 to about 150° C. with stirring and held there for a period of from about 3 to about 5 hours. The resulting mixture is extracted with warm water subsequently made basic (pH 9) with a 10% sodium carbonate solution. The reaction product as free base is then extracted with an organic solvent, for example, chloroform separated, dried and isolated by evaporation of solvent. The oil residue crystallizes on standing and may be recrystallized.

The 5-nitroimidazole starting materials are either commercially available or described in the literature and can be easily made by well-known organic synthetic procedures. As for the p-toluenesulfonate starting materials, a suitable working procedure has been worked out and can be shown chemically by the following sequence:

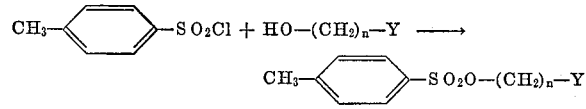

To p-toluenesulfonyl chloride dissolved in ethylene dichloride is added the appropriate alcohol followed by the addition of a slight molar excess of a 40% aqueous solution of sodium hydroxide. During the addition of base, the reaction temperature is maintained at 15–25° C. by means of an ice-bath. On completion of addition, the reaction mixture is stirred at room temperature for another 10–20 hours and then diluted with water. The ethylene dichloride layer is separated, washed with 2 N HCl and then water, and then dried sodium sulfate. The dried solution is then concentrated leaving an oil residue product. Generally, this resulting intermediate can be used directly in the next step in the condition it is isolated; however, if desired, it can be crystallized from a suitable solvent or allowed to crystallize on standing.

The 5-nitroimidazole compounds disclosed herein are preferably administered as such or in the form of acid addition salts containing pharmaceutically-acceptable anions. Examples of acids which provide pharmaceutically-acceptable anions are hydrochloric, hydrobromic, hydroiodic, nitric, sulfuric, or sulfurous, phosphoric, acetic, lactic, citric, tartaric, oxalic, succinic, maleic and gluconic. The conversion of the herein disclosed 5-nitroimidazole compounds to their acid addition salts comprises treating said compounds with a substantially equimolar amount of a chosen acid in a suitable organic solvent such as methanol or ethanol. Since the acid addition salts of the novel compounds disclosed herein are somewhat unstable under aqueous conditions, especially in aqueous acid solutions, it is preferred to prepare such salts under anhydrous conditions. When such salts are to be used for human consumption, either orally or parenterally, the acids which are used to prepare the pharmaceutically-acceptable addition salts must, of course, be those which necessarily form non-toxic acid addition salts.

The method of treatment employed for the control of trichomonal infections which is particularly preferred is oral administration, however, topical and parenteral application are also found to be suitable. Moreover, said oral medicament can be supplied in the form of a tablet formulation characterized by high trichomonadicidal power and capable of giving symptomatic relief to the host.

The activity of the novel herein disclosed compounds is determined by an in vivo test in the following manner: animals to be tested are inoculated with a trichomonal test organism (intra-peritoneally). Dose levels of antitrichomonal agent ranging from 10 to 200 mg./kg. is administered orally over a period of three days once a day. On the completion of said time period, a comparison is made based on the number cleared of infection/number of infected animals, between those treated with the herein disclosed anti-trichomonal agents and a control, 1-(2-hydroxyethyl)-2-methyl-5-nitroimidazole.

The following examples are provided by way of illustration and should not be interpreted as limiting the invention, many variations of which are possible without departing from the spirit or scope thereof.

EXAMPLE I 1-(2-nitroethyl)-2-methyl-5-nitroimidazole (A) A mixture containing 2-methyl-5-nitroimidazole (12.7 g.) and 2-nitroethyl-p-toluenesulfonate (45 g.) is stirred and heated to 140° C. for about 3–4 hours. After this heating period, the reaction mixture is allowed to cool and then extracted with hot water (3× with 200 ml.). The aqueous phase is then adjusted to a pH of 9 with 10% sodium carbonate solution and then extracted three times with 150 ml. portions of chloroform. The chloroform extract is separated, washed, dried and evaporated almost to dryness. On standing, the product crystallizes.

(B) The necessary reagent 2-nitroethyl-p-toluenesulfonate used above is prepared in the following manner:

To a solution of p-toluenesulfonyl chloride (95 g.) in ethylene dichloride (125 ml.) is added 2-nitroethanol (49 g.) followed by the addition of 22 g. of a 40% aqueous sodium hydroxide solution. This latter addition is over a ½ hour period and the temperature of the reaction mixture is held at 15–25° C. during this time by means of an ice-bath. On completion, the mixture is stirred for another 20 hours at room temperature. The organic phase is separated, washed with 2 N HCl, then water, dried and evaporated to dryness to give a good yield of product.

EXAMPLE II 1-(2-trifluoromethylsulfonylethyl)-2-methyl-5-nitroimidazole

The procedure of Example I (part A) is repeated wherein a stoichiometric equivalent amount of 2-trifluoromethylsulfonylethyl-p-toluenesulfonate is used in place of 2-nitroethyl-p-toluenesulfonate with comparable results.

Similarly, 2 - trifluoromethylsulfonylethyl-p-toluenesulfonate is prepared by means of the procedure outlined in part B of Example I wherein a stoichiometric equivalent amount of 2-trifluoromethylsulfonyl ethanol is used in lieu of 2-nitroethanol with good results.

EXAMPLE III 1-(2-aminosulfonylethyl)-2-methyl-5-nitroimidazole

The procedure of Example I (part A) is repeated wherein a stoichiometric equivalent amount of 2-aminosulfonylethyl-p-toluenesulfonate is used in place of 2-nitroethyl-p-toluenesulfonate with comparable results.

Similarly, 2-aminosulfonylethyl-p-toluenesulfonate is prepared by means of the procedure outlined in part B of Example I wherein a stoichiometric equivalent amount of 2-aminosulfonylethanol is used in lieu of 2-nitroethanol with good results.

EXAMPLE IV 1-(2-pentafluorothioethyl)-2-methyl-5-nitroimidazole

The procedure of Example I (part A) is repeated wherein a stoichiometric equivalent amount of 2-pentafluorothioethyl-p-toluenesulfonate is used in place of 2-nitroethyl-p-toluenesulfonate with comparable results.

Similarly, 2-pentafluorothioethyl-p-toluenesulfonate is prepared by means of the procedure outlined in part B of Example I wherein a stoichiometric equivalent amount of 2-pentafluorothioethanol is used in lieu of 2-nitroethanol with good results.

EXAMPLE V 1-(2-ditrifluoromethylaminoethyl)-2-methyl-5-nitroimidazole

The procedure of Example I (part A) is repeated wherein a stoichiometric equivalent amount of 2-ditrifluoromethylaminoethyl-p-toluenesulfonate is used in place of 2-nitroethyl-p-toluenesulfonate with comparable results.

Similarly, 2 - ditrifluoromethylaminoethyl-p-toluenesulfonate is prepared by means of the procedure outline in part B of Example I wherein a stoichiometric equivalent amount of 2-ditrifluoromethylaminoethanol is used in lieu of 2-nitroethanol with good results.

EXAMPLE VI 1-(2-trifluoromethylaminoethyl)-2-methyl-5-nitroimidazole

The procedure of Example I (part A) is repeated wherein a stoichiometric equivalent amount of 2-trifluoromethylamino ethyl-p-toluenesulfonate is used in place of 2-nitroethyl-p-toluenesulfonate with comparable results.

Similarly, 2 - trifluoromethylaminoethyl-p-toluenesulfonate is prepared by means of the procedure outline in part B of Example I wherein a stoichiometric equivalent amount of 2-trifluoromethylaminoethanol is used in lieu of 2-nitroethanol with good results.

EXAMPLE VII 1-(2-dimethylsulfonylmethylethyl)-2-methyl-5-nitroimidazole

The procedure of Example I (part A) is repeated wherein a stoichiometric equivalent amount of 2-dimethylsulfonylmethylethyl-p-toluenesulfonate is used in place of 2-nitroethyl-p-toluenesulfonate with comparable results.

Similarly, 2-dimethylsulfonylmethylethyl-p-toluenesulfonate is prepared by means of the procedure outlined in part B of Example I wherein a stoichiometric equivalent amount of 2-dimethylsulfonylethanol is used in lieu of 2-nitroethanol with good results.

EXAMPLE VIII

1-(2-dicyanomethylethyl)-2-methyl-5-nitroimidazole

The procedure of Example I (part A) is repeated wherein a stoichiometric equivalent amount of 2-dicyanomethylethyl-p-toluenesulfonate is used in place of 2-nitroethyl-p-toluenesulfonate with comparable results.

Similarly, 2-dicyanomethylethyl-p-toluenesulfonate is prepared by means of the procedure outlined in part B of Example I wherein a stoichiometric equivalent amount of 2-dicyanomethylethanol is used in lieu of 2-nitroethanol with good results.

EXAMPLE IX

The procedure of Example I (part A) is repeated wherein stoichiometric amounts of the following 5-nitroimidazole derivatives and p-toluenesulfonates are reacted in place of 2-methyl-5-nitroimidazole and 2-nitroethyl-p-toluenesulfonate, respectively, with the indicated products being obtained in substantial yields:

| 5-nitroimidazole derivative | p-Toluenesulfonate | Product |
|---|---|---|
| 2-ethyl-5-nitroimidazole | 1-(methylaminosulfonyl)methyl-p-toluenesulfonate | 1-(1-methylaminosulfonyl-methyl))-2-ethyl-5-nitroimidazole. |
| 2-propyl-5-nitroimidazole | 3-(butylaminosulfonyl) propyl-p-toluenesulfonate | 1-(3-butylaminosulfonyl-propyl)-2-propyl-5-nitroimidazole. |
| 2-butyl-5-nitroimidazole | 1-(diethylaminosulfonyl)methyl-p-toluenesulfonate | 1-(1-diethylaminosulfonylmethyl)-2-butyl-5-nitroimidazole. |
| 2-isopropyl-5-nitroimidazole | 2-(dibutylsulfonylmethyl)ethyl-p-toluenesulfonate | 1-[2-(dibutylsulfonylmethyl)]ethyl-2-isopropyl-5-nitroimidazole. |
| 2-isobutyl-5-nitroimidazole | 1-(diethylsulfonylmethyl)methyl-p-toluenesulfonate | 1-(1-diethylsulfonylmethyl methyl)-2-isobutyl-5-nitroimidazole. |
| 2-methyl-5-nitroimidazole | 2-(dibutylsulfonylmethyl)-ethyl-p-toluenesulfonate | 1-(2-dibutylsulfonylmethyl ethyl)-2-methyl-5-nitroimidazole. |
| 2-ethyl-5-nitroimidazole | 3-(dicarbomethoxymethyl)-propyl-p-toluenesulfonate | 1-(3-dicarbomethoxy-methyl propyl)-2-ethyl-5-nitroimidazole. |
| 2-propyl-5-nitroimidazole | 4-(dicarbobutoxymethyl)-butyl-p-toluenesulfonate | 1-(4-dicarbobutoxy-methylbutyl)-2-propyl-5-nitroimidazole. |
| 2-isopropyl-5-nitroimidazole | 2-trifluoroacetylethyl-p-toluenesulfonate | 1-(2-trifluoroacetyl-ethyl)-2-isopropyl-5-nitroimidazole. |
| 2-butyl-5-nitroimidazole | 3-(tricyanomethyl)propyl-p-toluenesulfonate | 1-(3-tricyanomethyl-propyl)-2-butyl-5-nitroimidazole. |
| 2-methyl-5-nitroimidazole | 4-(dinitromethyl)butyl-p-toluenesulfonate | 1-(4-dinitromethyl butyl)-2-methyl-5-nitroimidazole. |
| 2-ethyl-5-nitroimidazole | 1-(trinitromethyl)methyl-p-toluenesulfonate | 1-(trinitromethyl methyl)-2-ethyl-5-nitroimidazole. |

EXAMPLE X

The 5-nitroimidazole compounds disclosed herein may be converted to their acid addition salts by the following general procedure:

To a methanolic solution containing the 5-nitroimidazole free base (1 mole) is added a stoichiometric equivalent amount of a suitable acid. The resulting solution is subsequently stripped free of solvent and the precipitated product is filtered and dried. Other solvents, for example, ethanol, may be used. The following acid addition salts are typical examples prepared using the above procedure and substantial yields of product are obtained:

| Free Base | Acid | Acid Addition Salt |
|---|---|---|
| 1-(2-nitroethyl)-2-methyl-5-nitroimidazole | HCl | 1-(2-nitroethyl)-2-methyl-5-nitro-imidazole hydrochloride. |
| 1-(2-trifluoromethylsulfonyl-ethyl)-2-methyl-5-nitroimidazole. | HBr | 1-(2-trifluoromethylsulfonylethyl)-2-methyl-5-nitroimidazole hydrobromide. |
| 1-(2-aminosulfonylethyl)-2-methyl-5-nitroimidazole. | HI | 1-(2-aminosulfonylethyl)-2-methyl-5-nitroimidazole hydroiodide. |
| 1-(2-pentafluorothioethyl)-2-methyl-5-nitoimidazole. | Citric acid | 1-(2-pentafluorothioethyl)-2-methyl-5-nitroimidazole citrate. |

What is claimed is:

1. A compound of the formula:

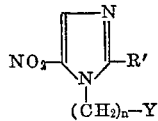

wherein $n$ is an integer from 1 to 3; R' is alkyl of from 1 to 4 carbon atoms; Y is selected from the group consisting of —$SF_5$, —$SO_2CF_3$, —$SO_2NH_2$, —$SO_2NHR$, —$SO_2NR_2$, —$NHCF_3$, —$N(CF_3)_2$, —$CH(SO_2R)_2$, —$CH(COOR)_2$,

—$CH(CN)_2$, —$C(CN)_3$, —$CH(NO_2)_2$, —$C(NO_2)_3$ and —$NO_2$ wherein R is alkyl of from 1 to 4 carbon atoms and the pharmaceutically-acceptable acid addition salts thereof.

2. A compound as claimed in claim 1 wherein R' is $CH_3$ and $n$ is 2.

3. A compound as claimed in claim 2 wherein Y is —$SO_2CF_3$.

4. A compound as claimed in claim 2 wherein Y is —$SO_2NH_2$.

5. A compound as claimed in claim 2 wherein Y is —$SF_5$.

6. A compound as claimed in claim 2 wherein Y is —$N(CF_3)_2$.

7. A compound as claimed in claim 2 wherein Y is —NH—$CF_3$.

8. A compound as claimed in claim 2 wherein Y is —$CH(SO_2CH_3)_2$.

9. A compound as claimed in claim 2 wherein Y is —$CH(CN)_2$.

10. A compound as claimed in claim 2 wherein Y is —$NO_2$.

References Cited

UNITED STATES PATENTS

| | | | |
|---|---|---|---|
| 3,244,726 | 4/1966 | Karmas | 260—309 |
| 3,376,311 | 4/1968 | Butler | 260—309 |
| 3,399,193 | 8/1968 | Giraldi et al. | 260—309 |

FOREIGN PATENTS 1,003,091  9/1965  Great Britain.

HENRY R. JILES, Primary Examiner

NATALIE TROUSOF, Assistant Examiner

U.S. Cl. X.R.

260—456; 424—273